United States Patent
Nikam et al.

(10) Patent No.: US 10,148,082 B2
(45) Date of Patent: Dec. 4, 2018

(54) SYSTEM AND METHOD FOR MULTI-LEVEL ELECTRONIC PROTECTION USING COMBINATION OF CURRENT SENSING AND TEMPERATURE SENSING

(71) Applicant: Honeywell International Inc., Morris Plains, NJ (US)

(72) Inventors: Vijay Nikam, Nashik (IN); Amit Kulkarni, Hyderabad (IN)

(73) Assignee: Honeywell International Inc., Morris Plains, NJ (US)

( * ) Notice: Subject to any disclaimer, the term of this patent is extended or adjusted under 35 U.S.C. 154(b) by 284 days.

(21) Appl. No.: 15/052,661

(22) Filed: Feb. 24, 2016

(65) Prior Publication Data

US 2017/0244238 A1    Aug. 24, 2017

(51) Int. Cl.
| | |
|---|---|
| *H02H 5/04* | (2006.01) |
| *H02H 1/00* | (2006.01) |
| *H02H 3/20* | (2006.01) |
| *H03K 17/082* | (2006.01) |
| *H02H 3/08* | (2006.01) |
| *H02H 3/087* | (2006.01) |
| *H03K 17/18* | (2006.01) |

(52) U.S. Cl.
CPC .......... *H02H 5/041* (2013.01); *H02H 1/0069* (2013.01); *H02H 3/20* (2013.01); *H02H 3/08* (2013.01); *H02H 3/087* (2013.01); *H03K 17/0822* (2013.01); *H03K 17/18* (2013.01)

(58) Field of Classification Search
USPC ................................... 361/86–87, 93.7–93.9
See application file for complete search history.

(56) References Cited

U.S. PATENT DOCUMENTS

| | | | |
|---|---|---|---|
| 7,800,875 B2 | 9/2010 | Flay et al. | |
| 8,873,211 B1 * | 10/2014 | Butler | H02H 9/04 361/86 |
| 2003/0048008 A1 | 3/2003 | Castagnet et al. | |
| 2008/0238529 A1 | 10/2008 | Kumagai | |

(Continued)

OTHER PUBLICATIONS

Foreign Communication from Related Counterpart Application; PCT Patent Application No. PCT/US2017/015346; International Search Report dated Jan. 27, 2017; 3 pages.

(Continued)

*Primary Examiner* — Danny Nguyen

(57) ABSTRACT

An apparatus includes a current sense resistor configured to receive a supply current for one or more devices. The apparatus also includes a current sense amplifier configured to amplify a voltage across the current sense resistor. The apparatus further includes a comparator configured to compare the amplified voltage from the current sense amplifier to a reference voltage. In addition, the apparatus includes an octal driver configured to receive the supply current from the current sense resistor and to control one or more device outputs associated with the one or more devices. The apparatus may also include an optocoupler configured to receive an output from the comparator and, based on the output, control an output enable pin of the octal driver. There could be multiple resistors, amplifiers, comparators, drivers, and optocouplers arranged in multiple circuit branches, which could be configured to control multiple device outputs associated with different groups of devices.

20 Claims, 4 Drawing Sheets

(56) References Cited

U.S. PATENT DOCUMENTS

| | | | |
|---|---|---|---|
| 2009/0021880 A1* | 1/2009 | Flay | G05B 19/0425 |
| | | | 361/101 |
| 2012/0113551 A1 | 5/2012 | Huang | |
| 2012/0229191 A1* | 9/2012 | Galm | H03K 17/735 |
| | | | 327/427 |
| 2012/0242304 A1 | 9/2012 | Yra et al. | |
| 2015/0309497 A1* | 10/2015 | Calvin | G05B 19/056 |
| | | | 700/86 |

OTHER PUBLICATIONS

Foreign Communication from Related Counterpart Application; PCT Patent Application No. PCT/US2017/015346; Written Opinion of the International Searching Authority dated May 4, 2017; 5 pages.

* cited by examiner

SYSTEM AND METHOD FOR MULTI-LEVEL ELECTRONIC PROTECTION USING COMBINATION OF CURRENT SENSING AND TEMPERATURE SENSING

TECHNICAL FIELD

This disclosure relates generally to electronic circuits. More specifically, this disclosure relates to a system and method for multi-level electronic protection using a combination of current sensing and temperature sensing.

BACKGROUND

Industrial process control and automation systems are often used to automate large and complex industrial processes. These types of systems routinely include various components including sensors, actuators, and controllers. The controllers typically receive measurements from the sensors and generate control signals for the actuators. Over time, some of these components may become obsolete and need to be replaced by newer components.

SUMMARY

This disclosure provides a system and method for multi-level electronic protection using a combination of current sensing and temperature sensing.

In a first embodiment, an apparatus includes a current sense resistor configured to receive a supply current for one or more devices. The apparatus also includes a current sense amplifier configured to amplify a voltage across the current sense resistor. The apparatus further includes a comparator configured to compare the amplified voltage from the current sense amplifier to a reference voltage. In addition, the apparatus includes an octal driver configured to receive the supply current from the current sense resistor and to control one or more device outputs associated with the one or more devices.

In a second embodiment, an input/output (I/O) device includes an application board. The application board includes a current sense resistor configured to receive a supply current for one or more devices. The application board also includes a current sense amplifier configured to amplify a voltage across the current sense resistor. The application board further includes a comparator configured to compare the amplified voltage from the current sense amplifier to a reference voltage. In addition, the application board includes an octal driver configured to receive the supply current from the current sense resistor and to control one or more device outputs associated with the one or more devices.

In a third embodiment, a method includes receiving, at a current sense resistor, a supply current for one or more devices. The method also includes amplifying, using a current sense amplifier, a voltage across the current sense resistor. The method further includes comparing, using a comparator, the amplified voltage from the current sense amplifier to a reference voltage. In addition, the method includes receiving, at an octal driver, the supply current from the current sense resistor and controlling one or more device outputs associated with the one or more devices.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4B, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
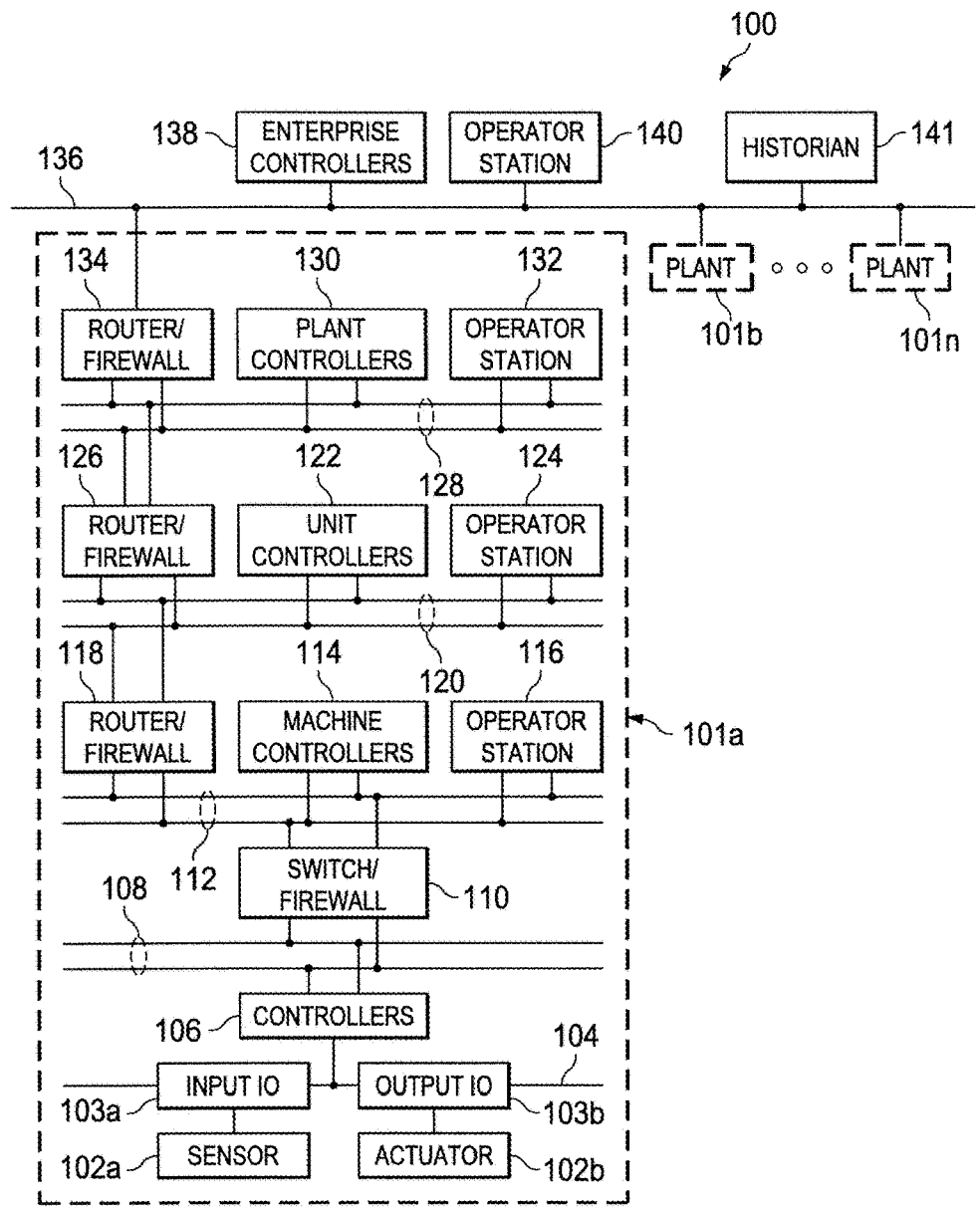
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. In some embodiments, the controller 106 can communicate instructions and data with the sensors 102a and actuators 102b through one or more I/O modules 103a-103b. That is, the controller 106 can receive measurements from one or more sensors 102a through one or more input I/O modules 103a, and can control operation of one or more actuators 102b through one or more output I/O modules 103b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

As described in more detail below, various components in the system 100 could be designed or modified to support multi-level electronic protection using a combination of current sensing and temperature sensing. For example, an input/output (I/O) device could include an application board, where the application board includes multiple current sense resistors, multiple current sense amplifiers, at least one comparator, and multiple octal drivers. The current sense resistors are configured to receive a supply current for one or more devices, such as one or more field devices (like sensors 102a or actuators 102b). Each of the current sense amplifiers is configured to amplify a voltage across one of the current sense resistors. The at least one comparator is configured to compare the amplified voltage from each current sense amplifier to a reference voltage. Each of the octal drivers is configured to receive the supply current that is output from one of the current sense resistors and to control one or more outputs associated with the one or more devices. In this way, improved protection can be provided to various components of the system 100 (such as the controllers 106) using current sensing and temperature sensing.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which multi-level electronic protection using a combination of current sensing and temperature sensing can be supported. This functionality can be used in any other suitable system, and the system need not be related to industrial process control and automation.

Figure 2:
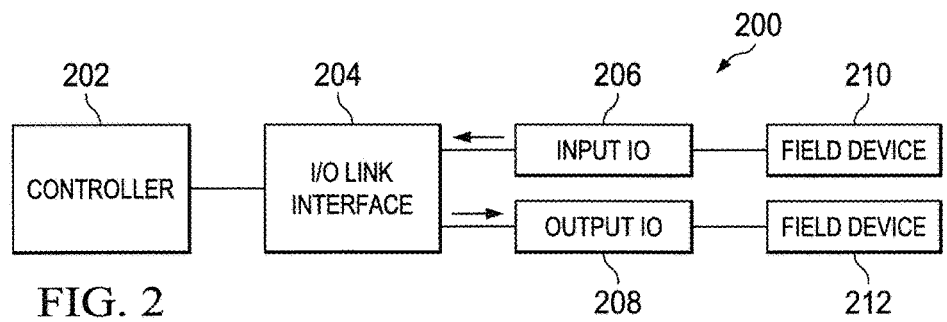
FIG. 2 illustrates a portion of an example controller input/output (I/O) system that may be used in conjunction with the system of FIG. 1 according to this disclosure.

FIG. 2 illustrates a portion of an example controller input/output (I/O) system 200 that may be used in conjunction with the system 100 of FIG. 1 according to this disclosure. As shown in FIG. 2, a controller 202 can communicate instructions and data through an I/O link interface 204 to one or more I/O modules 206-208. The I/O modules 206-208 interact with one or more field devices 210-212 (also referred to as "controlled devices") for controlling one or more industrial processes. The controller 202 could denote one of the controllers 106 in FIG. 1, and the field devices 210-212 could denote one or more of the sensors 102a or actuators 102b in FIG. 1. In particular embodiments, the controller 202 may denote an EXPERION SERIES C controller by HONEYWELL INTERNATIONAL INC.

The I/O module 206 in this example denotes an input module, meaning the module 206 receives data or other signals from a field device for input to a controller. The I/O module 208 in this example denotes an output module, meaning the module 208 provides data or other signals to a field device from a controller. Together, the I/O modules 206 and 208 can include or represent any number of analog inputs (AI), analog outputs (AO), digital inputs (DI), digital outputs (DO), pulse accumulator (PI) inputs, or other type(s) of input(s) or output(s) (or any combination thereof). The controller 202 is configured to control the various devices 206-212. In some instances, a single controller 202 can transmit and receive hundreds of associated signals that are manipulated by a controller application to perform pre-defined actions, such as turning on and turning off the field devices 210-212.

In normal operation, the controller 202 receives input data associated with operation of the field device 210, such as by periodically scanning data from the I/O module 206. The controller 202 performs processing on the input data and, based on the processed data, controls the field device 212 by transmitting data or signals to the I/O module 208. The I/O module 208 can, in turn, drive appropriate voltage, current, or other signals to the field device 212.

In some cases, such as over months or years of product or system use, one or more components of a process control and automation system or a controller I/O system may become obsolete. For example, one or more hardware components of the I/O module 208 may be discontinued or no longer be supported by a manufacturer. Obsolete or unsupported components can present a significant issue to system stakeholders, particularly when there is a large installed base at multiple plant sites.

To address these and other issues, the controller I/O system 200 can be redesigned to include replacement parts for one or more obsolete components, such as one or more components associated with the I/O module 208. The replacement design supports the use of multi-level electronic protection using a combination of current sensing and temperature sensing. The replacement design can also be selected by identifying components that should be available for a lengthy period of time (such as for at least 8-10 years). This approach helps to increase life cycle support and decrease overall system costs. In some instances, the replacement design may require no substantive changes to form fit or to module functions and features of the system 200.

Although FIG. 2 illustrates one example of a portion of a controller I/O system 200 that may be used in conjunction with the system 100 of FIG. 1, various changes may be made to FIG. 2. For example, the arrangement shown in FIG. 2 is for illustration only. Components could be added, omitted, combined, or placed in any other suitable configuration according to particular needs. Also, FIG. 2 illustrates one example environment in which multi-level electronic protection using a combination of current sensing and temperature sensing can be supported. This functionality can be used in any other suitable device or system, and the device or system need not be related to industrial process control and automation.

Figure 3:
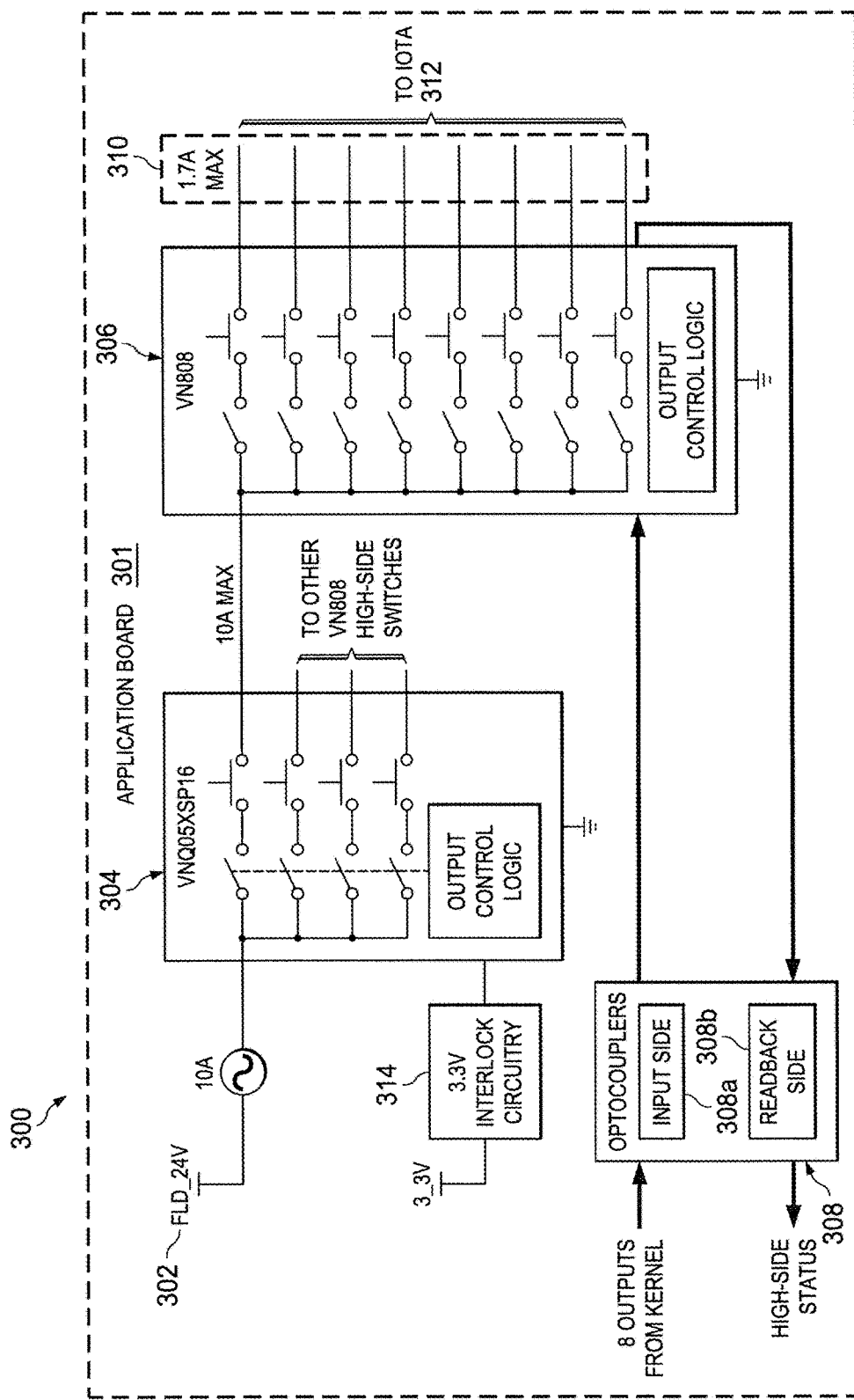
FIG. 3 illustrates components of an existing I/O module with one or more obsolete parts according to this disclosure.

FIG. 3 illustrates components of an existing I/O module 300 with one or more obsolete parts according to this disclosure. The I/O module 300 may be used in conjunction with controllers in an industrial process control and automation system (such as the system 100) and may represent the I/O module 208 of FIG. 2.

The I/O module 300 shown in FIG. 3 represents a HONEYWELL SERIES C 24V digital output module that provides control of thirty-two 24V digital outputs and interfaces over an enhanced I/O link to a HONEYWELL C300 controller. The I/O module 300 includes a kernel processor board with a microprocessor (not shown) and an application board 301. The application board 301 includes a power supply 302, a high-side driver 304, four octal high-side switch devices 306 (only one of which is shown in FIG. 3), and a plurality of optocouplers 308. The optocouplers 308 include input-side optocouplers 308a and readback-side optocouplers 308b. The application board 301 also includes thirty-two optically isolated 24V current sourcing outputs 310 (eight of which are shown in FIG. 3). Each current sourcing output 310 represents an optically isolated feedback path for verifying the status of a field output. A digital output 24V input/output termination assembly (IOTA) 312 provides all external connections for the I/O module 300. The application board 301 further includes interlock circuitry 314.

The high-side driver 304 is used to drive the four octal high-side switch devices 306, which in turn drive the thirty-two current sourcing outputs 310. In normal operation, the current sourcing outputs 310 are constrained to 0.5 A maximum per output. The high-side driver 304 includes four outputs, each of which is coupled to one of the octal high-side switch devices 306. Each output of the high-side driver 304 provides a 24V supply to its corresponding octal high-side switch device 306, typically at 7.5 A.

The I/O module 300 features active current limiting combined with thermal shutdown. By configuration, the maximum output current allowed per octal high-side switch device 306 is 4 A (8×0.5 A). Thus, the high-side driver 304 can provide a minimum of 1 A in excess of the maximum required by each output device. In the event that the outputs 310 of one of the octal high-side switch devices 306 average between 0.625 A and 1.25 A and the current limiting at the outputs has not tripped, the current limiting function of the channel of the high-side driver 304 supplying that group of eight outputs 310 can trip, thus removing the power from that output device.

Each channel of the octal high-side switch device 306 is independently current limited to between 0.7 A and 1.7 A. The high-side driver 304 and the octal high-side switch devices 306 use junction temperature-based protection for over-current and short-circuit current events. There are two levels of protection defined in the active current limiting. The first level of protection is based on the junction temperature of the channel. An over-current condition causes the junction of the device associated with that channel to rise above a high temperature threshold (typically 175° C.). When that occurs, the output is turned off until the junction falls below a low temperature threshold (typically 135° C.). The second level of protection is activated when the temperature of the housing of the device reaches a second high temperature threshold (typically 130° C.). When that occurs, the output is turned off until the housing temperature falls to a second low temperature threshold (110° C.). The second level of protection is provided by the high-side driver 304.

The application board 301 monitors the state of thirty-two software-controlled output signals that are provided by the kernel processor. Each output signal from the kernel processor is used to drive an optical isolator circuit on the application board 301. The signals are galvanically isolated by the optocouplers 308 and converted to 24VDC levels by the four octal high-side switch devices 306.

In some embodiments, the high-side driver 304 is a VNQ05XSP16 quad high-side driver from STMICROELECTRONICS INC., and each octal high-side switch device 306 is a VN808 octal high-side switch device from STMICROELECTRONICS INC. Both of these parts are older generation parts and have been or may be discontinued. As these parts are phased out, maintenance and support of the I/O module 300 will become more difficult and costly. For these reasons, embodiments of this disclosure provide an improved I/O module that includes replacements for the VNQ05XSP16 quad high-side driver and VN808 octal high-side switch device.

Although FIG. 3 illustrates one example of components of an existing I/O module 300 with one or more obsolete parts, various changes may be made to FIG. 3. For example, while the approaches for multi-level electronic protection using a combination of current sensing and temperature sensing may be described as being implemented to help replace the I/O module 300, the multi-level electronic protection approaches described in this patent document may find use in a large number of devices and systems and are not limited to I/O modules or replacements for the specific I/O module in FIG. 3.

Figure 4A:
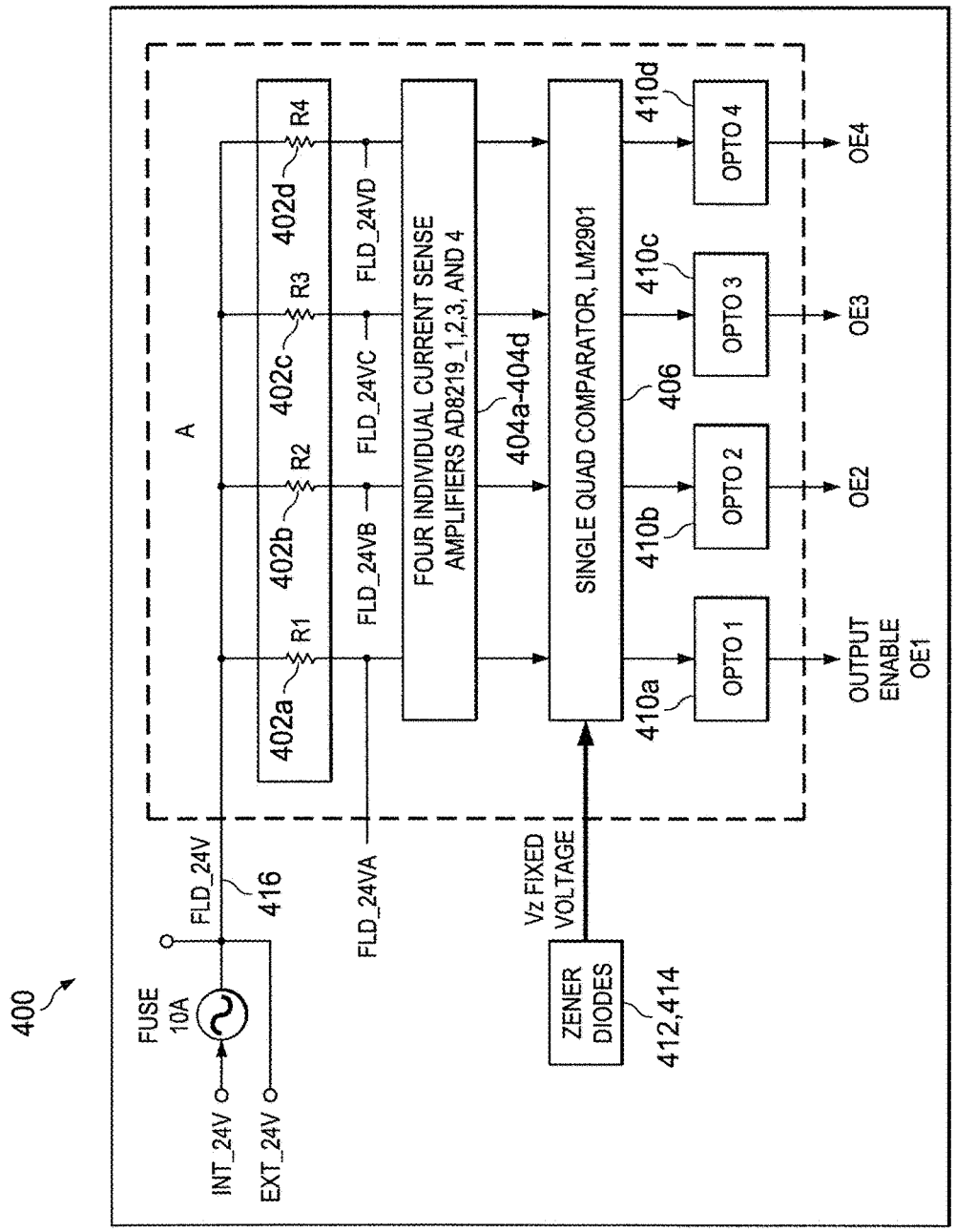
FIGS. 4A and 4B illustrate components of an improved I/O module according to this disclosure.
Figure 4B:
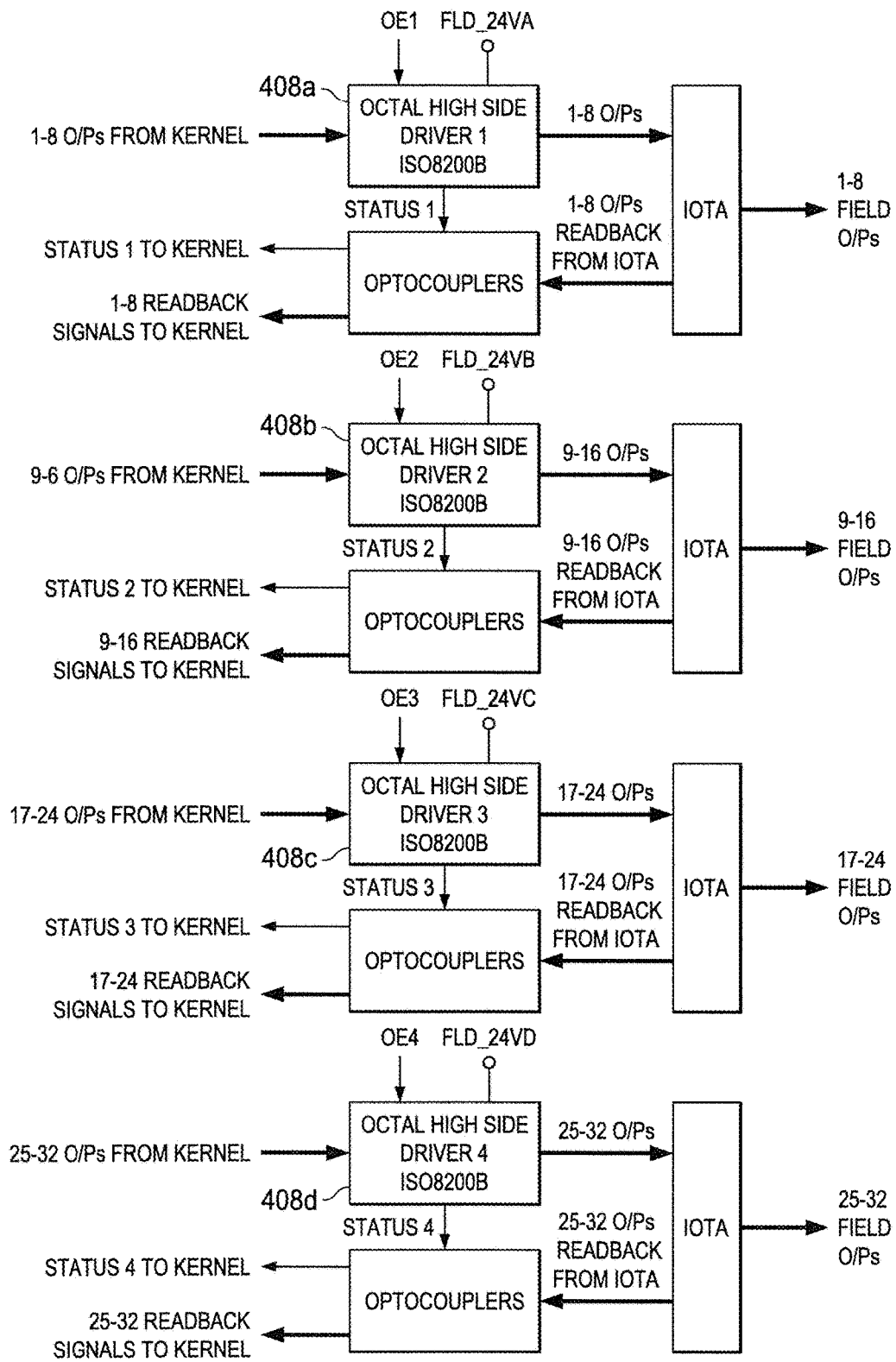

FIGS. 4A and 4B illustrate components of an improved I/O module 400 according to this disclosure. The I/O module 400 may be used in conjunction with controllers in an industrial process control and automation system (such as the system 100) and may represent the I/O module 208 of FIG. 2. The I/O module 400 may also be used in any other suitable system. The I/O module 400 includes various components described above with respect to the I/O module 300 of FIG. 3. However, the I/O module 400 includes a number of advantageous features not found in the I/O module 300.

As described above, the high-side driver 304 and the octal high-side switch devices 306 in the I/O module 300 use junction temperature-based protection for over-current and short-circuit current events. The octal high-side switch devices 306 provide a first level of protection, and the high-side driver 304 provides a second level of protection. In the I/O module 400, newer octal drivers are used for the first level of protection using a junction temperature-based protection method to switch off the power supply to the I/O module's outputs. For the second level of protection, a new approach uses a circuit having discrete components instead of an off-the-shelf device. The new circuit is based on current-sensing techniques and is more accurate compared to the I/O module 300. In the I/O module 400, the second level of protection uses an Enable signal from the first level protection device to switch off I/O module outputs if the over-current condition occurs.

As shown in FIGS. 4A and 4B, the I/O module 400 includes four current sense resistors 402a-402d, four current sense amplifiers 404a-404d, at least one comparator 406, four octal drivers 408a-408d, four optocouplers 410a-410d, two Zener diodes 412-414, and a field device power supply 416. A combination of one current sense resistor, one current sense amplifier, one octal driver, and one optocoupler forms a functional group or circuit branch associated with a group of eight field outputs. Since there are four of each of these components, the I/O module 400 supports thirty-two field outputs. Note, however, that the number of each component and the total number of field outputs can vary as needed or desired.

Each current sense resistor 402a-402d receives a load current from the field device power supply 416 and outputs the current to a corresponding octal driver 408a-408d. As the current passes through each current sense resistor 402a-402d, a voltage develops that can be sensed by the corresponding current sense amplifier 404a-404d. Each current sense resistor 402a-402d denotes any suitable resistive structure having any suitable resistance, such as a CRF2512FXR010 current sense resistor from BOURNS (which is a precise 10 mΩ resistor).

Each current sense amplifier 404a-404d senses the current from the field device power supply 416 flowing through the corresponding current sense resistor 402a-402d and the corresponding voltage at the current sense resistor 402a-402d. The current sense amplifier 404a-404d receives the resistor voltage and amplifies the voltage by a gain factor, resulting in an amplified voltage output. In some embodiments, the gain factor is approximately sixty, although the gain factor could be higher or lower. The amplified voltage generated by the current sense amplifier 404a-404d is output to the comparator 406. Each current sense amplifier 404a-404d includes any suitable structure for generating a current sense signal, such as an AD8219 current sensor amplifier from ANALOG DEVICES.

The at least one comparator 406 includes input terminals configured to receive the amplified voltages from the current sense amplifiers 404a-404d and a reference voltage Vz (such as about 3.9V) from the Zener diode 412. The at least one comparator 406 compares the values of the amplified voltages from the current sense amplifiers 404a-404d to the reference voltage and sets its outputs high or low depending on the comparison. In normal operation, an output of the comparator 406 may be set to low and then may go high whenever a current flowing through an associated octal driver 408a-408d increases beyond its limit. The outputs of the comparator 406 are connected to the optocouplers 410a-410d. The comparator 406 includes any suitable structure for comparing voltages, such as an LM2901 quad differential comparator from TEXAS INSTRUMENTS (which includes four independent voltage comparators). Of course, individual comparators 406 or groups of comparators 406 could also be used.

Each octal driver 408a-408d receives current from the field device power supply 416 and drives a group of eight outputs. Each octal driver 408a-408d includes any suitable structure for driving a device output, such as an ISO8200B galvanic octal driver from STMICROELECTRONICS INC. The ISO8200B galvanic octal driver is similar to the existing VN808 driver (the octal high-side switch device 306 of FIG. 3). For example, the ISO8200B driver provides a first level of protection using a similar junction temperature-based protection method as the VN808 driver to switch off the power supply to the device outputs. In addition, the ISO8200B driver includes features that isolate the logic input side from the device output side, thereby eliminating the need for thirty-two optocouplers on the logic input side.

The optocouplers 410a-410d receive the outputs from the comparator 406 and drives Output Enable (OE) pins of the octal drivers 408a-408d to turn the device outputs on or off. Each OE pin can be used to control the power supply to a group of eight outputs, thereby enabling or disabling the outputs at the same time. In some embodiments, each OE pin operates with a short delay (such as about 10 ms) for proper operation.

The Zener diode 412 provides the reference voltage for the comparator 406. In some embodiments, the reference voltage is nominally about 3.9V and can vary between about 3.6V and about 3.9V due to tolerance and temperature variations. Of course, the reference voltage may be higher or lower. The Zener diode 414 provides an unregulated power supply voltage for the comparator 406. In some embodiments, the power supply voltage may be about 6.8V, although the power supply voltage may be higher or lower.

In one aspect of operation, current from the power supply 416 is divided into four branches to provide individual supply for the corresponding octal drivers 408a-408d, which collectively drive the thirty-two device outputs. The currents provided to the octal drivers 408a-408d flow through the current sense resistors 402a-402d. Voltages develop across the current sense resistors 402a-402d and are sensed and amplified by the current sense amplifiers 404a-404d.

The comparator 406 compares the outputs of the current sense amplifiers 404a-404d to the reference voltage Vz. During normal operation, the voltages across the inputs of the current sense amplifiers 404a-404d are less than a threshold. For example, when the load current of the I/O module 400 is less than about 6.5 A, the voltages across the inputs of the current sense amplifiers 404a-404d could be less than about 65 mV. With a gain factor having a value such as sixty, the output of each current sense amplifier 404a-404d is less than the reference voltage of the comparator 406, which could be about 3.9V. The comparator 406 senses that the outputs of the current sense amplifiers 404a-404d are within normal range, and the outputs of the comparator 406 are maintained at a specific value, such as a logic low value.

In an excess current situation, such as when the load current increases beyond about 6.5 A, one or more outputs of the current sense amplifier 404a-404d exceed the reference voltage Vz. The comparator 406 therefore senses that one or more of its inputs are higher than the reference voltage and sets one or more of its outputs to a suitable value, such as a high logic value. This causes at least one of the optocouplers 410a-410d to set its OE pin of at least one of the octal drivers 408a-408d to a specified value, such as a logic low value. This disables at least one of the octal drivers 408a-408d, and current quickly starts to decrease. When current decreases to a suitable level, the comparator 406 senses the lower voltage and outputs values that cause the optocouplers 410a-410d to set their OE pins to a specified level, such as a logic high, after a delay (such as about 10 ms). The process can be repeated until the load current resumes to a normal level (such as about 6.5 A or below).

As described above, the I/O module 400 can be used as a replacement for the I/O module 300 of FIG. 3. In particular, the high-side driver 304 of FIG. 3 can be replaced by components of the I/O module 400 shown in block A of FIG. 4A. Likewise, each of the octal high-side switch devices 306 of FIG. 3 can be replaced by one of the octal drivers 408a-408d.

Due to the architecture and operation of the I/O module 400, the input-side optocouplers 308a and the interlock circuitry 314 of FIG. 3 are not needed in the I/O module 400. In some embodiments, the readback circuitry of the I/O module 400 may be the same as existing readback circuitry for the I/O module 300, so there may be no need to change any firmware for the I/O module 400.

In the I/O module 300 of FIG. 3, the limiting current range is approximately 5-10 A, which is a broad 5A range. In contrast, the I/O module 400 can operate successfully in an narrower current range, such as from about 5.8 A to about 6.4 A (a range of only approximately 600 mA). This is a more accurate operational environment and results in reduced power consumption because of the increased accuracy of the current.

Although FIGS. 4A and 4B illustrate one example of components of an improved I/O module 400, various changes may be made to FIGS. 4A and 4B. For example, while four generally parallel paths are shown in the I/O module 400, the number of each component in the I/O module 400 can vary as needed or desired. Also, the I/O module 400 could support interactions with any number of device outputs. Further, components could be added, omitted, combined, or placed in any other configuration according to particular needs. In addition, while certain manufacturers and product numbers have been provided as examples, any other suitable components could be used.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a current sense resistor configured to receive a supply current for one or more devices;
   a current sense amplifier configured to amplify a voltage across the current sense resistor;
   a comparator configured to compare the amplified voltage from the current sense amplifier to a reference voltage; and
   an octal driver configured to receive the supply current from the current sense resistor and to control one or more device outputs associated with the one or more devices.

2. The apparatus of claim 1, further comprising:
   an optocoupler configured to receive an output from the comparator and, based on the output, control an output enable pin of the octal driver.

3. The apparatus of claim 2, wherein:
   the comparator is configured to provide a high or low output based on the comparison of the amplified voltage from the current sense amplifier to the reference voltage; and
   the output enable pin is configured to control a power supply to the one or more device outputs.

4. The apparatus of claim 1, further comprising:
   a first Zener diode configured to supply the reference voltage to the comparator; and
   a second Zener diode configured to supply power to the comparator.

5. The apparatus of claim 1, wherein the octal driver is configured to provide temperature-based protection by switching off a power supply to the one or more device outputs when a junction temperature exceeds a reference temperature.

6. The apparatus of claim 2, wherein:
   the current sense resistor comprises one of multiple current sense resistors;
   the current sense amplifier comprises one of multiple current sense amplifiers;
   the comparator comprises one of multiple comparators;
   the octal driver comprises one of multiple octal drivers;
   the optocoupler comprises one of multiple optocouplers; and
   the current sense resistors, current sense amplifiers, comparators, octal drivers, and optocouplers are arranged in multiple circuit branches.

7. The apparatus of claim 6, wherein the multiple circuit branches are configured to control multiple device outputs associated with different groups of devices.

8. The apparatus of claim 1, wherein the apparatus is configured to operate in a current range of approximately 600 mA.

9. An input/output (I/O) device comprising:
   an application board comprising:
      a current sense resistor configured to receive a supply current for one or more devices;
      a current sense amplifier configured to amplify a voltage across the current sense resistor;
      a comparator configured to compare the amplified voltage from the current sense amplifier to a reference voltage; and
      an octal driver configured to receive the supply current from the current sense resistor and to control one or more device outputs associated with the one or more devices.

10. The I/O device of claim 9, further comprising:
    an optocoupler configured to receive an output from the comparator and, based on the output, control an output enable pin of the octal driver.

11. The I/O device of claim 10, wherein:
    the comparator is configured to provide a high or low output based on the comparison of the amplified voltage from the current sense amplifier to the reference voltage; and
    the output enable pin is configured to control a power supply to the one or more device outputs.

12. The I/O device of claim 9, further comprising:
    a first Zener diode configured to supply the reference voltage to the comparator; and
    a second Zener diode configured to supply power to the comparator.

13. The I/O device of claim 9, wherein the octal driver is configured to provide temperature-based protection by switching off a power supply to the one or more device outputs when a junction temperature exceeds a reference temperature.

14. The I/O device of claim 10, wherein:
    the current sense resistor comprises one of multiple current sense resistors;
    the current sense amplifier comprises one of multiple current sense amplifiers;
    the comparator comprises one of multiple comparators;
    the octal driver comprises one of multiple octal drivers;
    the optocoupler comprises one of multiple optocouplers; and
    the current sense resistors, current sense amplifiers, comparators, octal drivers, and optocouplers are arranged in multiple circuit branches.

15. The I/O device of claim 14, wherein the multiple circuit branches are configured to control multiple device outputs associated with different groups of devices.

16. The I/O device of claim 9, wherein the I/O device is configured to operate in a normal current range approximately 600 mA in breadth.

17. A method comprising:
    receiving, at a current sense resistor, a supply current for one or more devices;
    amplifying, using a current sense amplifier, a voltage across the current sense resistor;
    comparing, using a comparator, the amplified voltage from the current sense amplifier to a reference voltage; and receiving, at an octal driver, the supply current from the current sense resistor and controlling one or more device outputs associated with the one or more devices.

18. The method of claim 17, further comprising:
receiving, at an optocoupler, an output from the comparator; and
based on the output, controlling an output enable pin of the octal driver.

19. The method of claim 18, further comprising:
providing, by the comparator, a high or low output based on the comparison of the amplified voltage from the current sense amplifier to the reference voltage;
wherein the optocoupler controls the output enable pin to control a power supply to the one or more device outputs.

20. The method of claim 17, further comprising:
switching off, by the octal driver, a power supply to the one or more device outputs when a junction temperature exceeds a reference temperature.

* * * * *